United States Patent
Baker (10) Patent No.: US 11,010,670 B2
(45) Date of Patent: May 18, 2021

(54) BUILDING A DEEP NEURAL NETWORK WITH DIVERSE STRATA

(71) Applicant: D5AI LLC, Maitland, FL (US)

(72) Inventor: James K. Baker, Maitland, FL (US)

(73) Assignee: D5AI LLC, Maitland, FL (US)

(*) Notice: Subject to any disclaimer, the term of this patent is extended or adjusted under 35 U.S.C. 154(b) by 0 days.

(21) Appl. No.: 16/620,058

(22) PCT Filed: Aug. 23, 2019

(86) PCT No.: PCT/US2019/047805
§ 371 (c)(1),
(2) Date: Dec. 6, 2019

(87) PCT Pub. No.: WO2020/046721
PCT Pub. Date: Mar. 5, 2020

(65) Prior Publication Data
US 2020/0387794 A1      Dec. 10, 2020

Related U.S. Application Data (60) Provisional application No. 62/723,012, filed on Aug. 27, 2018.

(51) Int. Cl.
*G06N 3/08*      (2006.01)
*G06N 5/04*      (2006.01)
(Continued)

(52) U.S. Cl.
CPC ........... *G06N 3/084* (2013.01); *G06N 3/0454* (2013.01); *G06N 5/046* (2013.01); *G06N 20/20* (2019.01)

(58) Field of Classification Search
CPC ............ G06N 3/08; G06N 3/04; G06N 3/063; G06N 3/082; G06N 20/00
(Continued)

(56) References Cited

U.S. PATENT DOCUMENTS 6,169,981 B1    1/2001    Werbos
2005/0246297 A1    11/2005    Chen et al.
(Continued)

FOREIGN PATENT DOCUMENTS

CN          1549182 A     11/2004
CN        107423705 A     12/2017
(Continued)

OTHER PUBLICATIONS

Huang et al.—"Stacked Generative Adversarial Networks"—2017—https://arxiv.org/abs/1612.04357 (Year: 2017).*
Makhzani et al.—"Adversarial Autoencoders"—2016—https://arxiv.org/abs/1511.05644 (Year: 2016).*
Zhang et al.—"StackGAN: Text to Photo-realistic Image Synthesis with Stacked Generative Adversarial Networks"—2017—https://arxiv.org/abs/1612.03242 (Year: 2017).*
(Continued)

*Primary Examiner* — Viker A Lamardo
(74) *Attorney, Agent, or Firm* — K&L Gates LLP (57) ABSTRACT

A deep neural network architecture comprises a stack of strata in which each stratum has its individual input and an individual objective, in addition to being activated from the system input through lower strata in the stack and receiving back propagation training from the system objective back propagated through higher strata in the stack of strata. The individual objective for a stratum may comprise an individualized target objective designed to achieve diversity among the strata. Each stratum may have a stratum support subnetwork with various specialized subnetworks. These specialized subnetworks may comprise a linear subnetwork to facilitate communication across strata and various specialized subnetworks that help encode features in a more compact way, not only to facilitate communication across strata but also to increase interpretability for human users and to facilitate communication with other machine learning systems.

35 Claims, 7 Drawing Sheets

(51) Int. Cl.
　　　*G06N 20/20*　　　(2019.01)
　　　*G06N 3/04*　　　(2006.01)
(58) Field of Classification Search
　　　USPC .......................................................... 706/25
　　　See application file for complete search history.

(56) References Cited

U.S. PATENT DOCUMENTS

| 2007/0011114 A1 | 1/2007 | Chen et al. |
| 2019/0095798 A1 | 3/2019 | Baker |

FOREIGN PATENT DOCUMENTS

| WO | WO 2018/175098 A1 | 9/2018 |
| WO | WO 2018/194960 A1 | 10/2018 |
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |
| WO | WO 20191005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

Lin et al.—"Dynamic fine-tuning stacked auto-encoder neural network for weather forecast"—Jul. 2018—https://www.researchgate.net/publication/326256601_Dynamic_fine-tuning_stacked_auto-encoder_neural_network_for_weather_forecast (Year: 2018).*
Lin et al.—"A Dynamic Data-Driven Fine-Tuning Approach for Stacked Auto-Encoder Neural Network"—2017—https://ieeexplore.ieee.org/document/8119155 (Year: 2017).*
Andrea de Giorgio—"A study on the similarities of Deep Belief Networks and Stacked Autoencoders"—2015—https://www.researchgate.net/publication/282575094_A_study_on_the_similarities_of_Deep_Belief_Networks_and_Stacked_Autoencoders (Year: 2015).*
Santara et al.—"Faster learning of deep stacked autoencoders on multi-core systems using synchronized layer-wise pre-training"—2016—https://arxiv.org/abs/1603.02836 (Year: 2016).*
Yao's Blog—"Stacked Denoising Autoencoders"—2015—https://web.archive.org/web/20171014035047/http://psyyz10.github.io/2015/11/SDA/ (Year: 2015).*
Liu et al.—"A Stacked Autoencoder-Based Deep Neural Network for Achieving Gearbox Fault Diagnosis"—Jul. 2018—https://www.hindawi.com/journals/mpe/2018/5105709/ (Year: 2018).*
Vincent et al.—"Stacked Denoising Autoencoders: Learning Useful Representations in a Deep Network with a Local Denoising Criterion"—2010—https://dl.acm.org/doi/10.5555/1756006.1953039 (Year: 2010).*
International Search Report and Written Opinion of the International Searching Authority for International Application No. PCT/US2019/047805 dated Nov. 5, 2019.

* cited by examiner

BUILDING A DEEP NEURAL NETWORK WITH DIVERSE STRATA

PRIORITY

The present application is a national stage application under 35 U.S.C. § 371 of PCT application Serial No. PCT/US19/47805, filed Aug. 23, 2019, which claims priority to U.S. Provisional Patent Application Ser. No. 62/723,012, filed Aug. 27, 2018, both having the same title and inventor as indicated above, and both of which are incorporated herein by reference.

BACKGROUND

Artificial intelligence has had remarkable success in recent years, especially with machine learning systems implemented on deep neural networks with many layers. For the most difficult problems, deep neural networks with more layers generally have better performance than deep neural networks with fewer layers. However, it usually becomes increasingly difficult to train deeper neural networks with more layers. For each network architecture and each training strategy, there generally is a maximum number of layers beyond which it has proven to be impractical to train a deeper network.

SUMMARY

The present invention, in one general aspect, introduces a deep neural network architecture comprising a stack of strata in which each stratum has its individual input and an individual objective, in addition to being activated from the system input through lower strata in the stack and receiving back propagation training from the system objective back propagated through higher strata in the stack of strata. The individual objective for a stratum may comprise an individualized target objective designed to achieve diversity among the strata. In addition, each stratum has a stratum support subnetwork with various specialized subnetworks. These specialized subnetworks may comprise a linear subnetwork to facilitate communication across strata and various specialized subnetworks that help encode features in a more compact way, not only to facilitate communication across strata but also to increase interpretability for human users and to facilitate communication with other machine learning systems. Thus, the invention can facilitate building and training deeper neural networks, which can solve more complex problems then shallower networks, often with fewer total parameters for a given level of performance. These and other benefits realizable with the present invention will be apparent from the description below.

FIGURES

Various embodiments of the present invention are described herein by way of example in conjunction with the following figures.

DETAILED DESCRIPTION

The following description has set forth aspects of computer-implemented devices and/or processes via the use of block diagrams, flowcharts, and/or examples, which may contain one or more functions and/or operations. As used herein, the terms "step" or "block" in the block diagrams and flowcharts refers to a step of a computer-implemented process executed by a computer system, which may be implemented as a machine learning system or an assembly of machine learning systems. Accordingly, each step or block can be embodied as a set of computer executable instructions stored in the memory of a computer system that, when executed by a processor of the computer system, cause the computer system to perform the described function(s). Each block can be implemented as either a machine learning system or as a nonmachine learning system, according to the function described in association with each particular block. Furthermore, each block can refer to one of multiple steps of a process embodied by computer-implemented instructions executed by a computer system (which may include, in whole or in part, a machine learning system) or an individual computer system (which may include, e.g., a machine learning system) executing the described step, which is in turn connected with other computer systems (which may include, e.g., additional machine learning systems) for executing the overarching process described in connection with each figure or figures.

Figure 1:
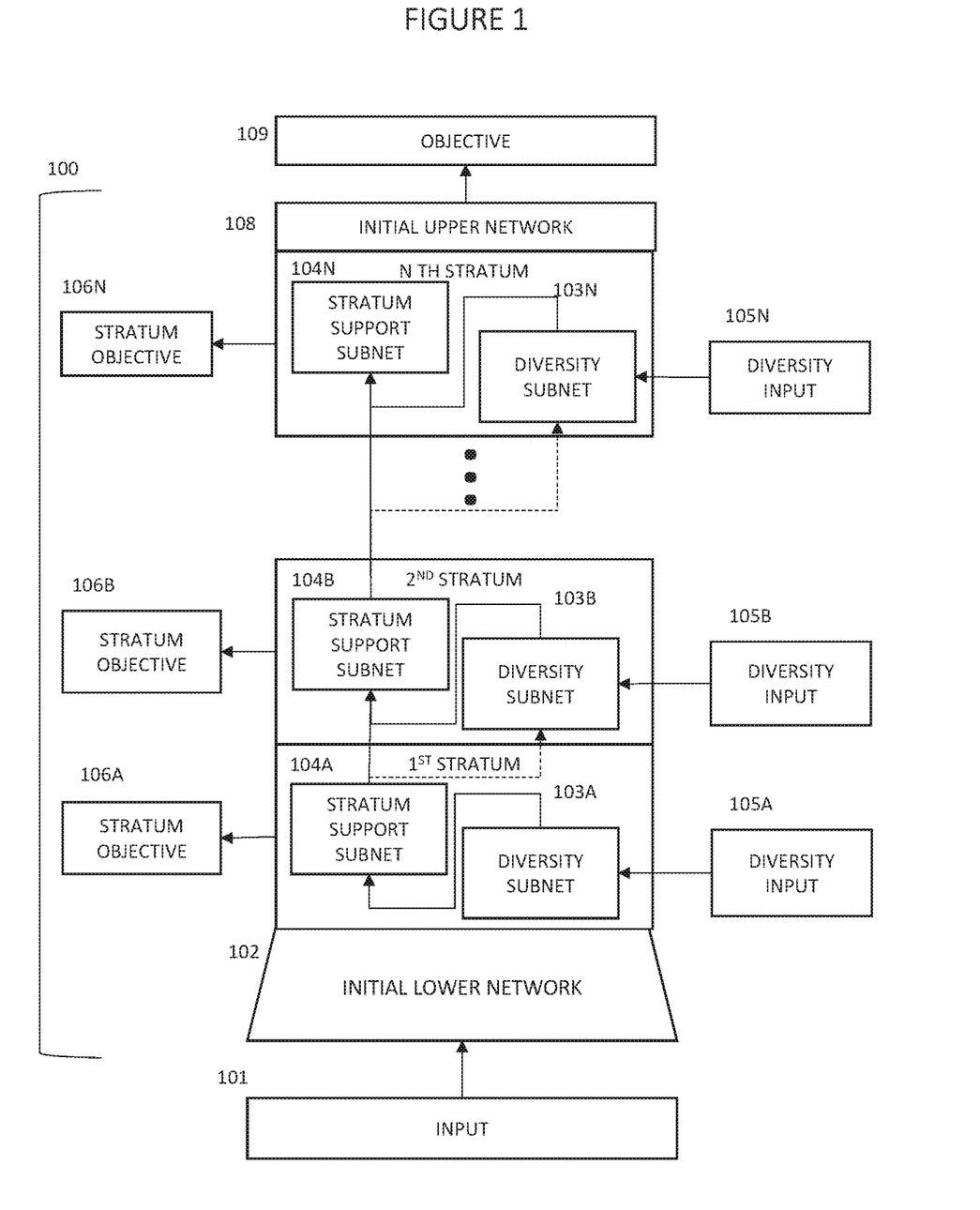
FIG. 1 is a block diagram of an illustrative embodiment of the invention described herein.

FIG. 1 is a diagram of an illustrative embodiment of a machine learning system 100, which can be embodied as a deep neural network system, organized into strata. A machine learning system 100 such as illustrated in FIG. 1 may be built stratum-by-stratum using the illustrative method shown in FIG. 2, which method may be performed by a computer system, such as the computer system 600 illustrated in FIG. 6.

Figure 7:
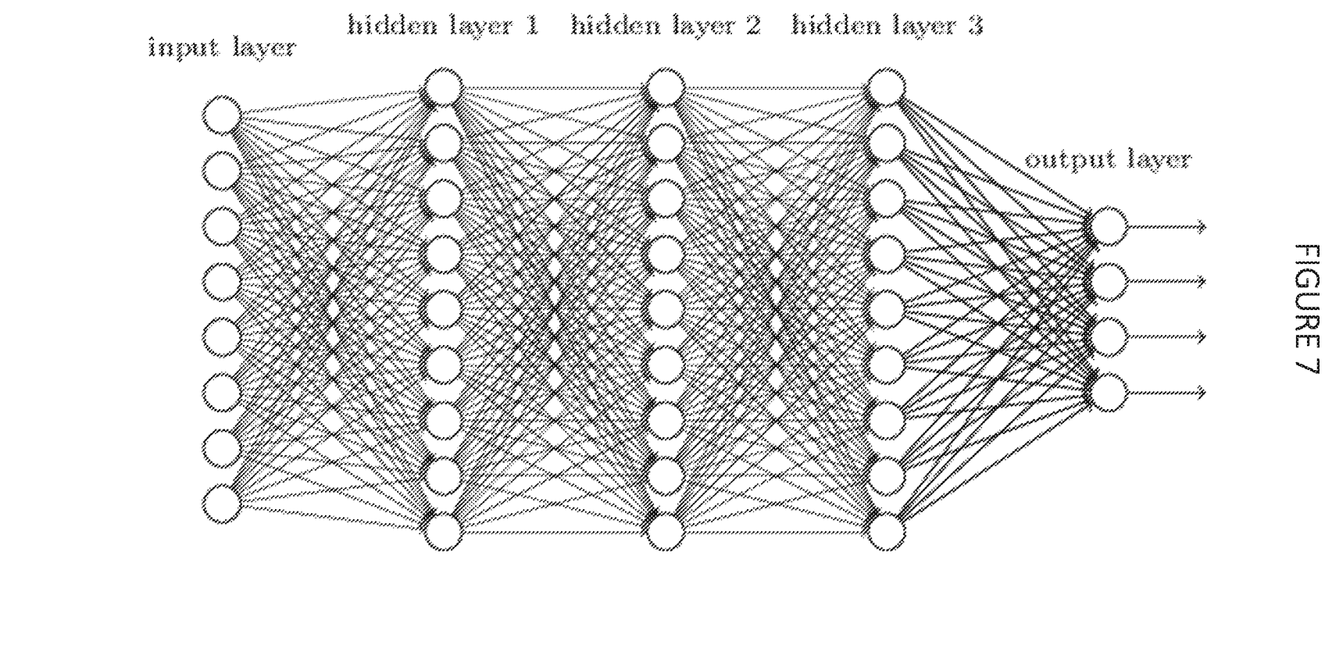
FIG. 7 is a diagram illustrating a deep neural network of the type that might be used in various aspects of various embodiments of the invention.

Many components of the machine learning system 100 illustrated in FIG. 1 are neural networks, such as networks 102, 103A-N, 104A-N, 108 which may be implemented as neural networks as shown in FIG. 7, which illustrates an example of a feed-forward neural network, although other types of neural networks could also be used for components 102, 103A-N, 104A-N, 108. A neural network is a collection of nodes and directed arcs. The nodes in a neural network are often organized into layers. In a feed-forward neural network, the layers may be numbered from bottom to top, when diagramed as in FIG. 7. Each directed arc in a layered feed-forward neural network goes from a source node in a lower layer to a destination node in a higher layer. The feed-forward neural network shown in FIG. 7 has an input layer, an output layer, and N inner layers. An inner layer in a neural network is also called a "hidden" layer. Each directed arc is associated with a numerical value called its "weight." Typically, each node other than an input node is associated with a numerical value called its "bias." The weights and biases of a neural network are called "learned" parameters. The values of the learned parameters are adjusted by the computer system 600 during training. Other parameters that control the training process are called hyperparameters.

A feed-forward neural network may be trained by the computer system 600 using an iterative process of stochastic gradient descent with one iterative update of the learned parameters for each minibatch. The full batch of training data is typically arranged into a set of smaller, disjoint sets called minibatches. An epoch comprises the computer system 600 doing a stochastic gradient descent update for each minibatch contained in the full batch of training data. For each minibatch, the computer estimates the gradient of the objective 109 in FIG. 1 for a training data item by first computing the activation of each node in the network using a feed-forward activation computation. The computer system 600 then estimates the partial derivatives of the objective 109 with respect to the learned parameters using a process called "back-propagation," which computes the partial derivatives based on the chain rule of calculus, proceeding backwards through the layers of the network. The processes of stochastic gradient descent, feed-forward computation, and back-propagation are well-known to those skilled in the art of training neural networks.

In the illustrative embodiment of FIG. 1, the machine learning system 100 is divided into strata. In this context, a "stratum" is a portion of the overall machine learning system 100 in which the subnetworks 103A-N, 104A-N reside. Thus, the overall machine learning system 100 comprises several strata, of subnetworks, as shown in FIG. 1. As described herein, the subnetworks 103A-N, 104 A-N in a stratum may have many layers, particularly since the subnetworks 103A-N, 104 A-N may be neural networks. In an illustrative embodiment, the machine learning system 100 can be built iteratively, stratum-by-stratum using, for example, the process 200 shown in FIG. 2. In some aspects, more than one stratum may be added in a single iteration. Further, more strata may always be added by additional iterations of the process 200.

The machine learning system 100 in FIG. 1 is a complex system comprising multiple subsystems that may be initially trained as stand-alone systems. Block 101 is the input to the machine learning system 100. Block 109 is the system objective for the machine learning system 100 and is also the primary objective for each of the individual diversity subnetworks 103A-N and stratum support subnetworks 104A-N. Block 102 is a network that may be initially trained with the input 101 and the objective 109 before the addition of a stratum. In some aspects, the initial network may be split into a lower network 102 and an upper network 108. In some aspects, the upper network 108 contains only the output nodes of the machine learning system 100.

In one aspect, each diversity subnetwork 103A-N has its own input 105A-N, which may comprise externally supplied input values and/or input values from system input 101. The input 105A-N for each of the diversity subnetworks 103A-N can be referred to as a "diversity input" or a "stratum input." Each stratum also has a secondary objective 106A-N, which may comprise multiple objectives. As discussed in association with FIG. 3, a secondary objective 106A-N may comprise an individual diversity objective and the primary objective 109 as a direct objective, which is in addition to the back-propagation from the primary objective 109 back through the upper network and higher strata. Each stratum support subnetwork 104A-N comprises various types of nodes and specialty node sets and networks to support various aspects of the invention. The types of nodes and structures that may be present in a stratum support subnetwork are discussed in association with FIGS. 3 and 4.

Block 108 comprises the output nodes for the machine learning system 100 and may also comprise an upper portion of the initial network. In some embodiments, block 108 may comprise an upper network that is trained from scratch during the training of the machine learning system 100 as more strata are added.

As indicated by the ellipse " . . . " in FIG. 1 and the label "$N^{th}$ STRATUM" on the top stratum, the number of strata is arbitrary. Having an individual input 105A-N and objective 106A-N for each stratum in addition to the system input 101 and the primary objective 109 facilitates training with a larger number of strata than would otherwise be practical, because having more direct connections to the input and an objective reduces the tendency for the magnitude of the gradient of the objective to go to zero (which is known as the "vanishing gradient" problem) or alternately to grow excessively large as the number of layers increases. As explained in association with FIG. 2, in various embodiments, there are connections from a stratum to the next higher stratum. In the particular example shown in FIG. 1, the directed arcs from the second stratum support subnetwork 104B to the Nth stratum support subnetwork 103N and the Nth stratum diversity subnetwork 104N only indicate directed arcs that would connect nodes in a stratum to nodes in the next higher stratum. Generally, the second stratum would not be directly connected to the Nth stratum if there are more than three strata. As explained in association with FIG. 3, a stratum support network may comprise linear as well as various kinds of specialty nodes and subnetworks. Linear nodes enable information to be passed easily from one stratum to higher strata by way of intervening strata.

Figure 2:
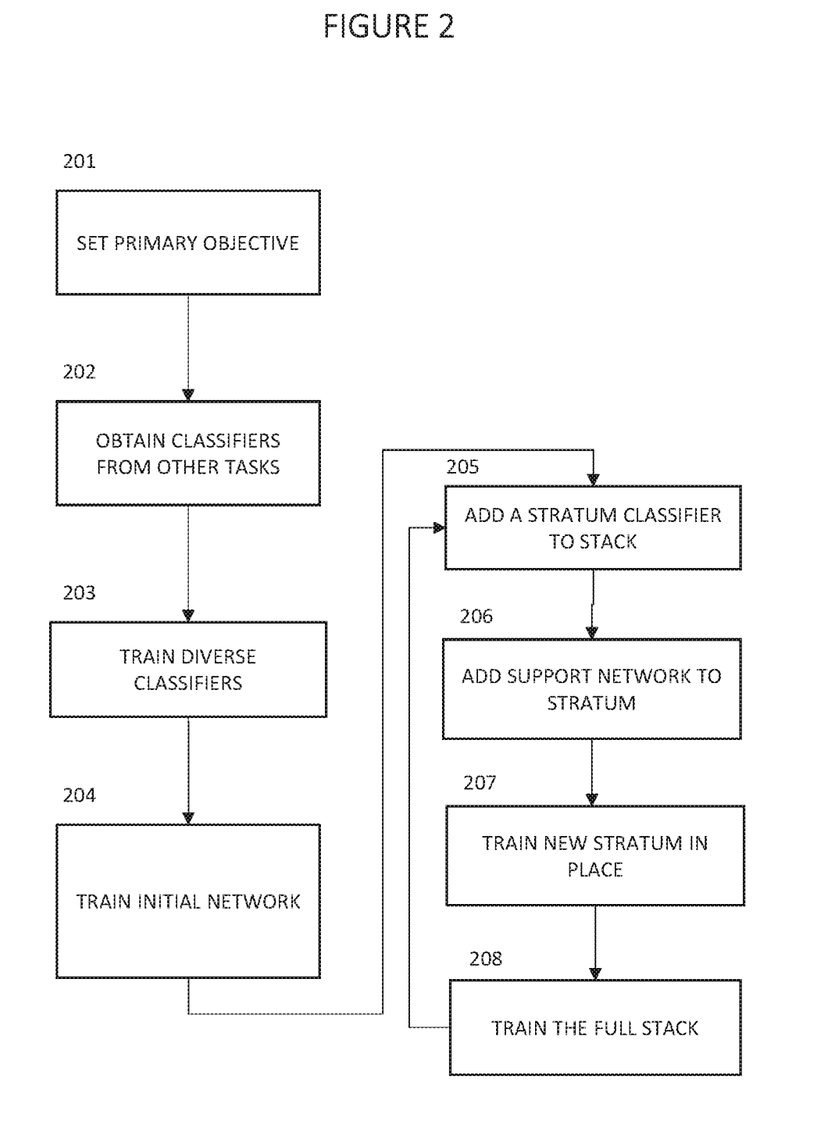
FIG. 2 is a flow chart of an illustrative embodiment of the invention.

FIG. 2 is a flow chart of an illustrative process 200 for building and training a machine learning system 100 with an arbitrary number of strata. In the following description of the process 200, reference should also be made to FIG. 1. In various aspects, the process 200 can be executed by a computer system, such as the computer system 600 illustrated in FIG. 6, and can be embodied as a set of instructions that, when executed by a processor of the computer system 600, cause the computer system 600 to perform the enumerated steps. Further, it should be understood that although the process 200 is described within the context of the diversity subnetworks 103A-N being classifiers, the described steps are generally applicable to building and training a machine learning system 100 with any type of neural network system and, thus, the process 200 should not be interpreted to be limited to the particular illustrated aspect.

At step 201, the computer system 600 sets the primary objective 109 for the machine learning system 100.

Step 202 is optional and may or may not be performed in various aspects of the process 200. At step 202, the computer system 600 optionally obtains classifiers that have been previously trained, perhaps on tasks with objectives other than the primary objective 109. The computer system 600 may obtain such classifiers by downloading or otherwise receiving and storing data about the classifiers, such as the weights and biases for the arcs between nodes, the node activation functions, etc.

At step 203, the computer system 600 trains or obtains classifiers that are initially trained to be diverse from each other with an objective that may be unrelated to the primary objective 109. For example, each of the classifiers trained in step 203 may be trained to detect an arbitrary subset of the training data to be used for training the machine learning system 100. Thus, there are up $2^T$ different training targets from which the computer system 600 may select a diverse set of classifiers in step 203, where T is the number of items of training data. The diverse classifiers trained at step 203 may be separate from the classifier obtained at optional step 202, and either or both may be used at step 205, described further below.

At step 204, the computer system 600 trains an initial network comprising, for example, blocks 102 and 108 of FIG. 1, with a primary input 101 and a primary objective 109. In some aspects, the initial network may be trained with a different input and/or a different objective. For example, the initial network may be trained on a simpler objective or on less data, leaving more refined training to later iterations of the stack building process.

At step 205, the computer system 600 begins a loop, comprising steps 205 to 208, that adds a stratum to the stack of strata in the machine learning system 100 in each iteration of the loop.

In each loop, at step 205, the computer system 600 adds one of the classifiers obtained or trained in step 203 or step 202 as the diversity subnetwork 103A-N in the new stratum being built in the loop. The new stratum may be placed at any position in the stack of existing strata and/or relative to the initial lower network 102 and the initial upper network 108. For example, a new stratum may be placed just below the upper network 108 and above all the existing strata. As another example, a new stratum may be placed just above the lower initial network 102 and below all the existing strata. As yet another example, a new stratum may be placed between any two existing strata. Some aspects of the process 200 can always place a new stratum at the top (i.e., just below the upper network 108). Some aspects of the process 200 can always place a new stratum at the bottom (i.e., just above the lower network 108). Some aspects of the process 200 vary the placement of a new stratum, based on rules set by the human designer and controlled by hyperparameters. In some aspects, more than one placement may be tried with the best placement chosen based on a performance comparison.

At step 206, the computer system 600 adds a stratum support subnetwork 104A-N to the new stratum being built. The new stratum support subnetwork 104A-N is preferably is at the same stratum level as the diversity subnetwork 103A-N added at step 205 in the iteration of the loop, as shown in FIG. 2.

When a new stratum is added to the stack, various embodiments make various kinds of connections to nodes in the new stratum from nodes in the network below the new stratum and from nodes in the new stratum to nodes in the network above. In some aspects of the process 200, nodes in both the diversity subnetwork 103A-N and nodes in the stratum support subnetwork 104A-N in the new stratum are connected to the neighboring strata, the lower network 102, and/or the upper network 108. In some aspects, only nodes in stratum support subnetwork 104A-N are connected to the neighboring strata. In some embodiments, only designated input nodes in either the stratum diversity subnetwork 103A-N or the stratum support subnetwork 104A-N receive connections from the network below. In some aspects, all of the nodes in the designated subnetwork 103A-N, 104A-N receive connections from below. In some aspects, only designated output nodes in either the stratum diversity subnetwork 103A-N or the stratum support subnetwork 104A-N make connections to nodes in the network above. In some aspects, all nodes in the designated subnetwork 103A-N, 104A-N make connections to nodes in the network above. These different connection choices do not make a fundamental change in the capabilities of the machine learning system 100, but they may affect the cost/performance and may affect the rate of learning. These choices may be controlled by hyperparameters that may be tuned to the best setting for a given application.

The stratum support subnetwork 104A-N being built may comprise a variety of nodes, specialized sets of nodes, and/or special networks. Some examples of such network elements are listed in stratum support subnetwork 304K in FIG. 3. An example of a specialized network is an autoencoder network, an example of which is illustrated in FIG. 4. In one aspect, directed arcs connecting the stratum diversity subnetwork 103A-N and the stratum support subnetwork 104A-N go from the diversity subnetwork 103A-N to the support subnetwork 104A-N to prevent loops among the directed arcs. In another aspect, directed arcs may go from the support subnetwork 104A-N to the diversity subnetwork 103A-N. In such aspects, the directed arcs can be arranged to avoid loops among the directed arc between the subnetworks 103A-N, 104A-N.

Figure 3:
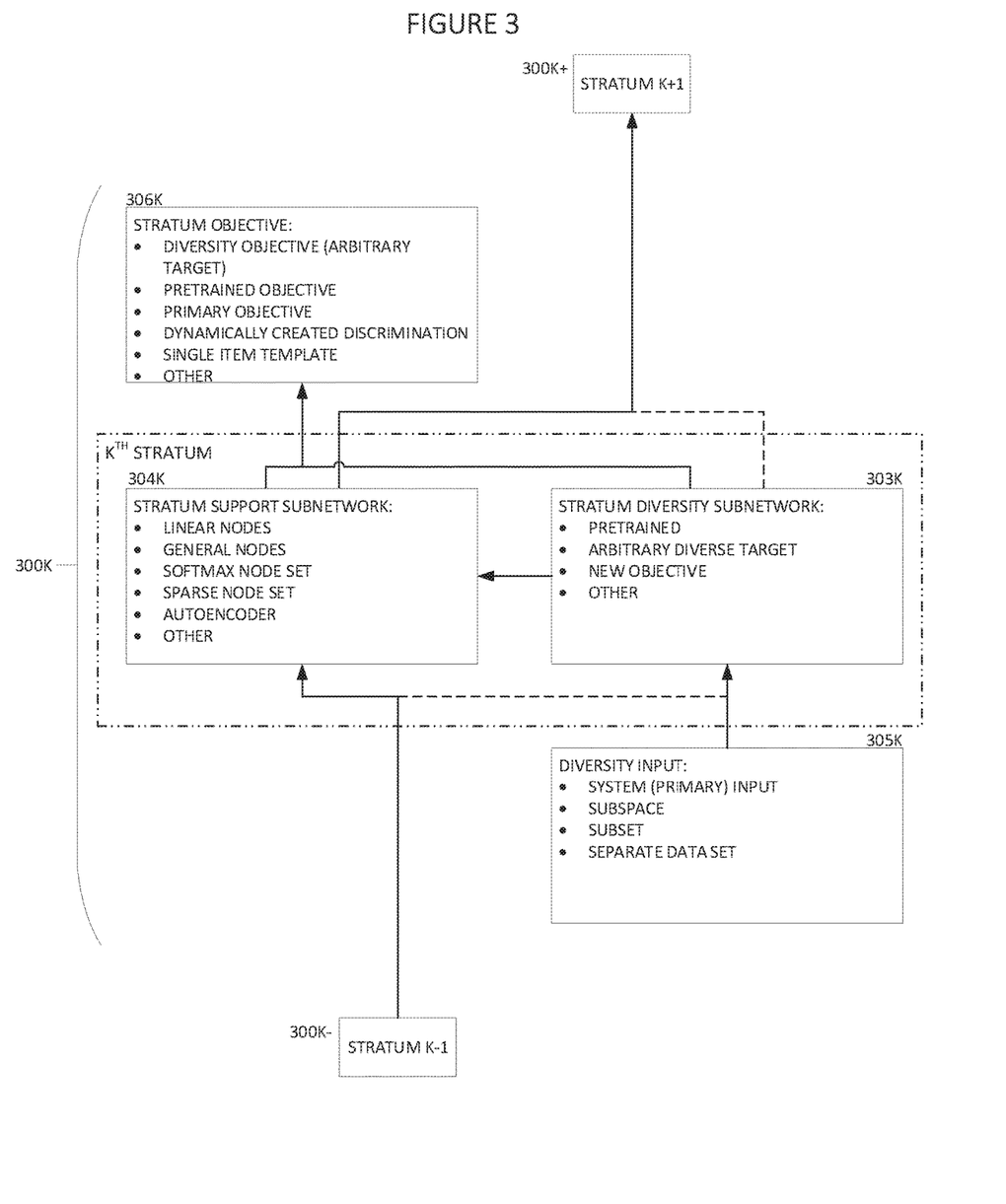
FIG. 3 is a block diagram of an aspect of the invention used in various embodiments of the invention.
Figure 4:
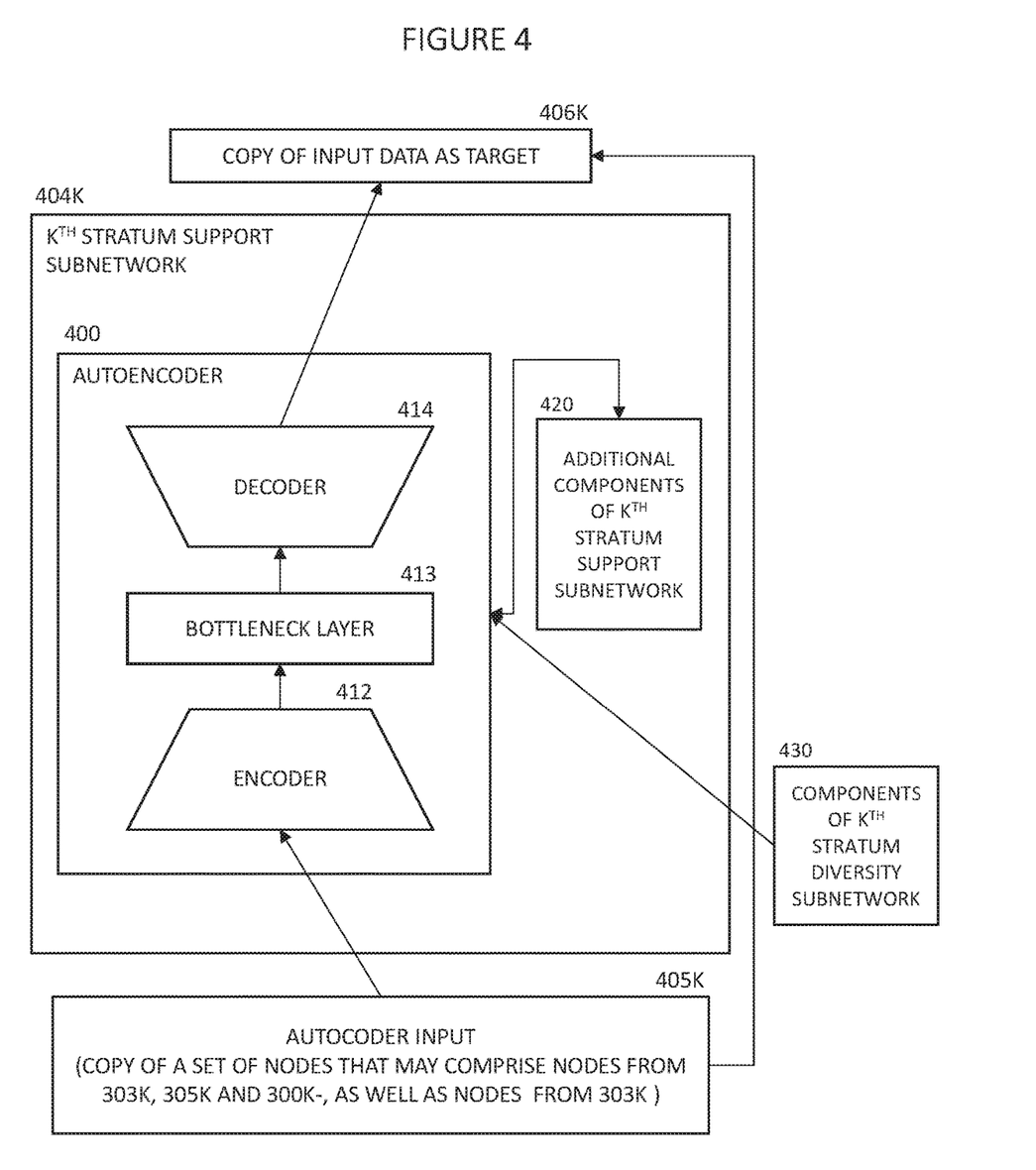
FIG. 4 is a block diagram of an autoencoder such as may be used in various aspects of various embodiments of the invention.

One type of node that may be present in the stratum support subnetwork 104A-N in a stratum is a linear node (as listed in block 304K of FIG. 3). Many deep neural network designs avoid using linear nodes. One reason for avoiding linear nodes is that two successive layers comprising nothing but linear nodes still only computes a linear transform, so multiple layers of linear nodes cannot compute anything that cannot be computed by a single layer. However, in the context of a stratum such as in the illustrative embodiment shown in FIG. 1, this disadvantage does not apply. The linear nodes in the stratum support subnetwork 104A-N may be connected to the diversity subnetwork 103A-N, as may be other nodes in stratum support subnetwork 104A-N, so the linear nodes in each stratum have access to values not directly available to the linear nodes in other strata. In addition, the linear nodes and other nodes in stratum support subnetwork 104A-N receive back propagation from the respective stratum objectives 106A-N, which also is only directly available to nodes in the stratum subnetworks 103A-N, 104A-N. Thus, the linear nodes in multiple stacked strata are in no way equivalent to a single layer of linear nodes.

Moreover, the linear nodes in stratum support subnetwork 104A-N can perform several valuable roles. First, in some aspects, the weights on the linear nodes in stratum support subnetwork 104A-N of a newly added stratum may be initialized by the computer system 600 to represent the identity function, with weights on all other connections to the next higher network being initialized to zero. With this initialization, a version of the machine learning system 100 with the new stratum (e.g., with a new diversity subnetwork 103A-N and a new stratum support network 104A-N) initially computes exactly the same output for each input as the version of the machine learning system 100 without the new stratum. If necessary, the computer system 600 can guarantee further improvement in performance by doing full batch gradient descent training with an arbitrarily small learning rate. In other words, the degradation in performance on training data that may happen with other neural network architectures when a neural network has too many layers may be avoided in training a deep stack of strata, no matter how deep.

In one aspect, when linear nodes in stratum support subnetwork 104A-N are initialized to represent the identity function, directed arcs from the stratum below the new stratum being added to the stratum above the new stratum being added are deleted. Deletion of connections that would skip across the new stratum avoids unnecessarily having the number of arcs grow proportional to the square of the number of strata. These deleted connections are, in effect, replaced by connections by way of the linear nodes in the new stratum. In some embodiments, a directed arc that skips strata may be selectively exempted from deletion or may be selectively added later.

At step 207, the computer system 600 trains the new stratum network defined by the diversity subnetwork 103A-N and the support subnetwork 104A-N placed in the deepened machine learning system 100 based on back propagation from the primary objective 109 and from the individual secondary or stratum objective 106A-N corresponding to the new stratum. In step 207, the computer system 600 may update learned parameters in the stratum subnetworks 103A-N, 104A-N for the new stratum without updating learned parameters in other subnetworks of the machine learning system 100. In some aspects, as explained more below, the training in step 207 may be terminated early, leaving further training to step 208. In some aspects, no training is performed by the computer system 600 in step 207.

At step 208, the computer system 600 trains all of the machine learning system 100, including the new stratum added at steps 205 and 206, as well as any other strata previously added through previous iterations of the loop and the initial networks 102, 108. In one aspect, this training is iterative training based on stochastic gradient descent. As explained below, in some aspects, this training is run to convergence, unless some other stopping criterion is met.

After step 208, the computer system 600 decides whether to return to step 205 or to terminate the training process.

In either step 207 or step 208, the computer system 600 may do the training by stochastic gradient descent with updates in minibatches, a training process that is well-known to those skilled in the art of training deep neural networks. The computer system 600 may run stochastic gradient descent to convergence unless some other stopping criterion is met first. In step 207, the computer system 600 may stop the stochastic gradient descent early in some embodiments based perhaps on a limit on the number of epochs since the new stratum is to be trained further in step 208.

In step 208, however, the decision of whether to return to step 205 or to terminate the training may depend on the level of performance that may be achieved when gradient descent is run to convergence. In some embodiments, the computer system 600 may stop the training in step 208 early and return step 205, which will be followed by additional training in step 208 as part of the next iteration of the loop. Preferably, in this situation the computer system 600 does not consider terminating the loop from step 205 to step 208. As the stack of strata gets deeper, the computer may run the training in step 208 to convergence to potentially terminate the training process.

On the other hand, there is no fixed limit on the depth of the stack or on the number of times that the computer system 600 may return to step 205 to add one or more strata to the stack. The computer system 600 may terminate the stack building based on any of several stopping criteria, such as (i) a limit on the size of the network being built, (ii) a limit on the amount of computation used in the training process, and/or (iii) an early stopping criterion based on degradation in performance measured on independent validation data. Some embodiments may have methods for correcting overfitting and may ignore degradation in performance on validation data and build a stack to greater depth and then apply the corrective actions. These embodiments take advantage of the capability of the invention to build arbitrarily deep stacks of strata.

An example of a corrective action is to generate additional data augmentation in regions where degradation in performance on validation data indicates that it is needed. Early stopping before convergence in gradient descent is itself a form of regularization. In building a stack of strata, early stopping of the process of adding more strata may prevent the training from building a deeper network with a more capable network, which in turn may make it more difficult to identify regions in which corrective action could be taken. Thus, early stopping may limit the maximum achievable performance, so methods of improving generalization to validation data other than early stopping may be preferred.

FIG. 3 is a diagram of an illustrative generic stratum 300K, where the "K" in the element numbers indicates that this illustrative stratum may be at any position within the stack in FIG. 1. FIG. 3 shows some of the options available for each of the subsystems within a stratum.

As indicated in FIG. 3, in various aspects, the stratum input 305K may comprise any of (i) the system (i.e., primary) input 101 of FIG. 1, (ii) the system input 101 projected to a subspace (i.e., the input variables to the diversity input 305K may be a subset of the input variables to the system input 101), (iii) a subset of the system input 101 (that is, the data set of training data for diversity input 305K may be a subset of the data set of training data for system input 101), or (iv) a separate data set. For example, the separate data set may be a data set that has been used in pretraining a diversity subnetwork 303K on a different task or may be a data set used to specify an arbitrary diversity target to train a diversity subnetwork 303K to be diverse from the diversity subnetworks in other strata.

A "diversity" target is defined as an objective in a set of objectives such that a diversity subnetwork in a stratum will train to be diverse from that diversity subnetworks in other strata. As an illustrative example, a diversity target may be determined by an arbitrary subset of a training data set with an objective for the output to be one value, say 1, for every training data item that is a member of the arbitrary subset and for the output to be a second value, say 0, for every training data item that is not a member of the arbitrary subset of the training data item. The purpose of the arbitrary subset is to provide a target for the diversity subnetwork in a stratum to have an objective that is diverse from the objective for the diversity network in other strata. In some embodiments, some strata may have the same target. However, it is possible to have as many as $2^T/2$ distinct diversity targets, where T is the number of training data items in the diversity training set. The division by 2 reflects the fact that having any subset S as a target is equivalent to having the complement of S as a target. The training data set for a diversity subnetwork may be different from the training data set for the primary objective 109, so the number of diversity training data items may be arbitrarily large. Because the target set is arbitrary, there is no need to that diversity training data items to be labeled with categories related to the primary objective 109. Other methods of defining arbitrary diverse objectives may be used in various embodiments.

Further details of training networks with arbitrary diverse targets are described in PCT Application No. PCT/US2019/046107, filed Aug. 12, 2019, entitled BUILDING DEEP LEARNING ENSEMBLES WITH DIVERSE TARGETS, which is incorporated herein by reference in its entirety.

In various aspects, the diversity subnetwork 303K may comprise any of (i) a pretrained network that has been trained to objective 109 or to any other objective, either using training data from system input 101 or other training data, (ii) a network trained to an arbitrary diversity target, (iii) a network trained from scratch to a new objective that is determined dynamically during the training of system 100, which may be initialized with random initialization, or (iv) a network obtained by any other means.

The diversity target in option (ii) may be an arbitrary division of a set of training data into two or more subsets. The training data does not need to be labeled with categories from the primary objective 109 or from any other source. The arbitrary division of the training data itself provides a target for training the diversity subnetwork 303K. This arbitrary division is designed only to give the diversity subnetworks different individual objectives from each other to increase diversity. In the training of the diversity subnetwork 303k placed in the machine learning system 100, this diversity target complements any classification category objective in the stratum objective 306K or the system primary objective 109 and the diversity target training data does not itself need to be labeled with categories from the primary objective 109. In one aspect, the stratum objective 306K can comprise the diversity target for the diversity subnetwork 303K and may comprise additional objectives as described below.

In various aspects, the stratum support subnetwork 304K may comprise any of (i) linear nodes, (ii) general nodes with non-linear activation functions, (iii) a softmax node set, (iv) a node set constrained or regularized to be sparsely activated, (v) an autoencoder network, and/or (vi) some other type of network. For option (v), an autoencoder network is discussed in association with FIG. 4. In some embodiments, the general nodes of option (ii) may be organized into layers with each layer fully connected to the adjacent layers. In some embodiments the number of layers in option (ii) may be limited, say to four layers, with more strata added to the machine learning system 100 as an alternative to having fewer strata with more general node layers in each. A softmax node set as in option (iii), a sparse node set as in option (iv), or an autoencoder bottleneck layer as in option (v) may facilitate the support subnetwork 304K learning more explicit feature representations that may be communicated to other strata and also be communicated externally to other machine learning systems and to human users.

In various aspects, the stratum objective 306K may comprise one or multiple objectives, such as (i) an arbitrary target set that may different for different strata to promote diversity, (ii) an objective for a pretrained network, (iii) the primary objective 109, (iv) a discrimination task that separates two or more training data items that are confusable, that is, that cause, in a network without the stratum objective 306K, output activation scores for which the difference in score between the correct answer and the best scoring incorrect answer is less than some specified value, (v) a single item template, and/or (vi) any other objective.

The purpose for objective option (i), a diversity target, has already been discussed, as has option (ii) for a diversity subnetwork that has already been trained either to objective 109 or to some other task.

In objective option (iii), the primary objective 109 is designed to reduce one of the problems that may occur in training a very deep neural network. During early training, the partial derivatives at the output of a deep neural network are mixed together and provide very little direction to the learned parameters in a layer that is many layers away from the output. This condition may persist for hundreds of thousands of updates in the training process. Each layer is unable to train effectively until the layer above has been sufficiently well trained to provide useful back propagation.

In aspects implementing option (iii), the primary objective among the objectives in stratum objective 306K avoids this problem, allowing stratum networks 303K and 304K to immediately begin to learn features that are relevant to objective 109 as well as other objectives in stratum objective 306K.

FIG. 4 is an illustrative aspect where a support subnetwork 404K of a Kth stratum includes an autoencoder 400. An autoencoder is a type of network that is sometimes said to learn by "unsupervised" training, because it does not require labeled training data. More precisely, an autoencoder network learns by "self-supervised" training. The training of an autoencoder network may use stochastic gradient descent training just as in supervised training. However, the autoencoder provides its own objective target 406K, which is just a copy of the input 405K.

In this aspects, as well as in autoencoders in general, the input 405K is encoded by an encoder network 412 to a representation in a bottleneck layer 413. The bottleneck layer is then decoded by a decoder network 414 to produce an output that is intended to be as close as possible to a copy of the input 405K, which is provided as the objective target 406K. The autoencoder 400 is not in general able to produce an exact copy of the input because the bottleneck layer 413 is significantly restricted, preventing the autoencoder network 400 from representing the identity function. Two types of restrictions are common for a bottleneck layer 413: (i) the bottleneck layer 413 has a much smaller number of nodes than the input 405K, or (ii) the activations of the bottleneck layer are sparse, that is, the non-negligible activations of the nodes in the bottleneck layer are restricted to a small subset of nodes. The sparsity may be enforced by a firm constraint or may be weakly enforced by relaxation.

The encoder 412 of an autoencoder learns to encode a more compact representation of the input 405K into the bottleneck layer 413. The more compact encoding is the purpose for having an autoencoder as an element within a stratum support subnetwork 404K. Having a more compact representation makes it easier for the system 100 to pass information from one stratum to another.

In addition, in the aspect illustrated in FIG. 4, the autoencoder 400 takes as input 405K a copy of an arbitrary set of nodes. A node in the set of nodes copied into the input 405K may be any node in the Kth stratum or any node in any lower stratum. Some embodiments select nodes from the current stratum K and the stratum K−1, which is just below the current stratum. The set of nodes selected for the input 405K for an autoencoder 400 may be selected based on the expectation that the selected nodes represent, in some unknown way, features that are useful for the classification objective 109. The encoding in the bottleneck layer 413 into a lower dimensional representation or into a sparse representation may reveal some features more explicitly. This more explicit representation may be useful for several purposes. Most directly, as already mentioned, it may be easier to transmit between strata. In addition, it may be easier for human users to interpret, and it may be easier to transmit to other machine learning systems.

In some aspects, nodes in the encoder 412 may also have directed arcs from nodes 430 in a diversity subnetwork 303K and/or from other components 420 of the stratum support subnetwork 304K. There also may be directed arcs from nodes in the encoder 412 to nodes in other components 420 of the stratum support network 304K, preferably selected such there are no loops of directed arcs.

Because an autoencoder is self-supervised, an autoencoder can easily be added to any stratum and may be set to encode any selected set of nodes.

Figure 5:
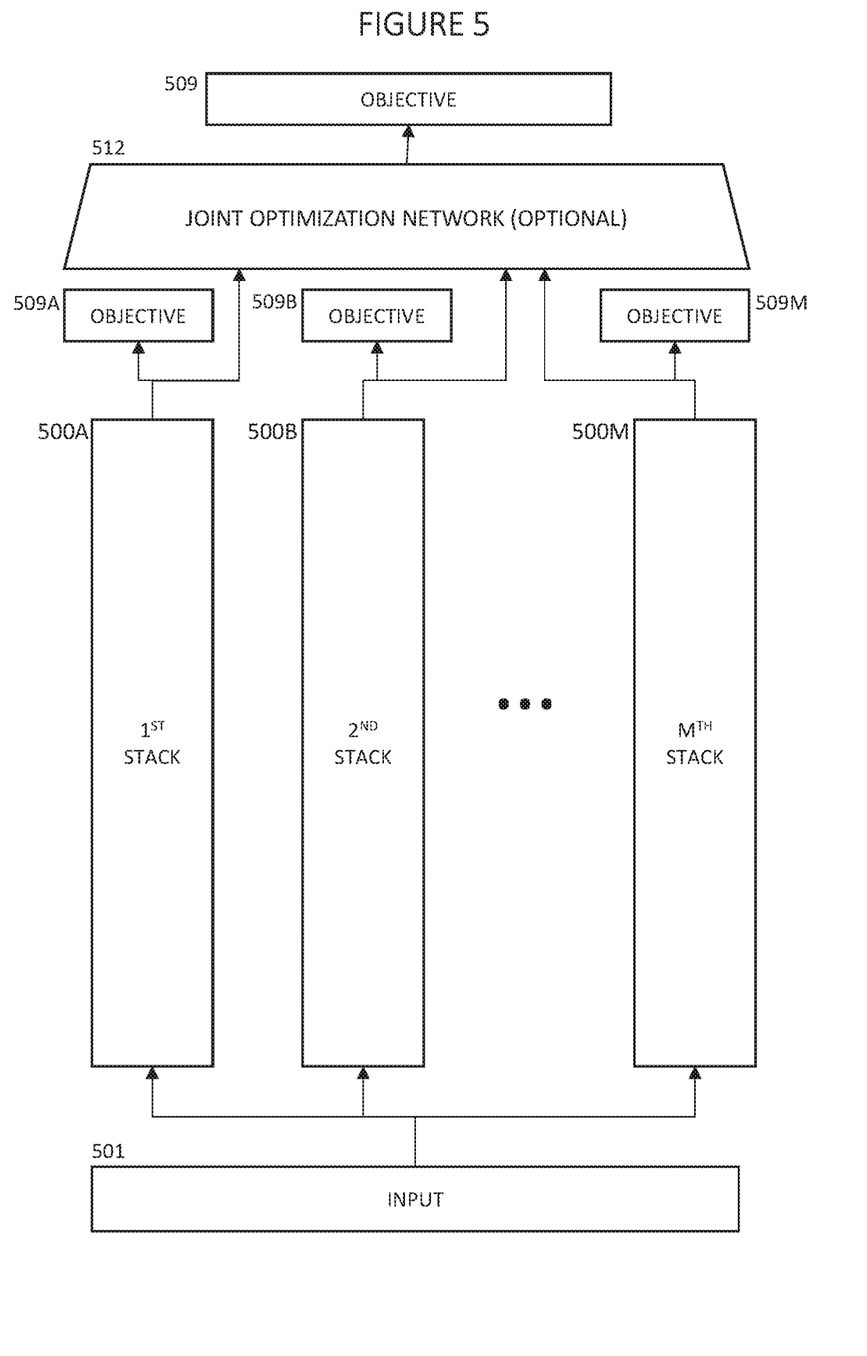

FIG. 5 shows an illustrative embodiment with an ensemble of deep neural networks with stacks of strata. In this illustrative embodiment, each of the stacks 500A-M receives the same input 501. Each of the stacks 500A-M can be a deep neural network stack of strata, as with the machine learning system 100 in FIG. 1. That is, each of the stacks 500A-M may be generated according to the process shown in FIG. 2. Further, each of the stacks 500A-M may be trained to a respective objective 509A-M in the same way as the machine learning system 100 of FIG. 1 is trained to objective 109. In some embodiments, some or all of the objectives 509A-M can be the same and the outputs of the systems 500A-M may be combined by averaging output scores by voting on the best category. The stratum objectives in individual strata objectives in each ensemble member also help make the ensemble members diverse from each other. Rearranging strata from one ensemble member to another is an additional source of diversity among the ensemble members. In general, more diversity among ensemble members improves the joint performance of an ensemble.

In some aspects, each of the ensemble members 500A-M is trained directly on an objective 509A-M and, in addition receives back propagation training from a joint optimization network 512 that each of the ensemble members 500A-M are connected to. The joint optimization network 512 can be trained to compute an optimum combination of the outputs of the ensemble members 500A-M and that also back propagates training to the member networks 500A-M to learn to jointly optimize a shared objective 513, which can be the same objective as each of the objectives 509A-M on which the ensemble members 500A-M are trained. More details about joint optimization networks can be found in PCT Application No. PCT/US2018/052857, filed Sep. 26, 2018, entitled JOINT OPTIMIZATION OF ENSEMBLES IN DEEP LEARNING, which is incorporated herein by reference in its entirety.

Figure 6:
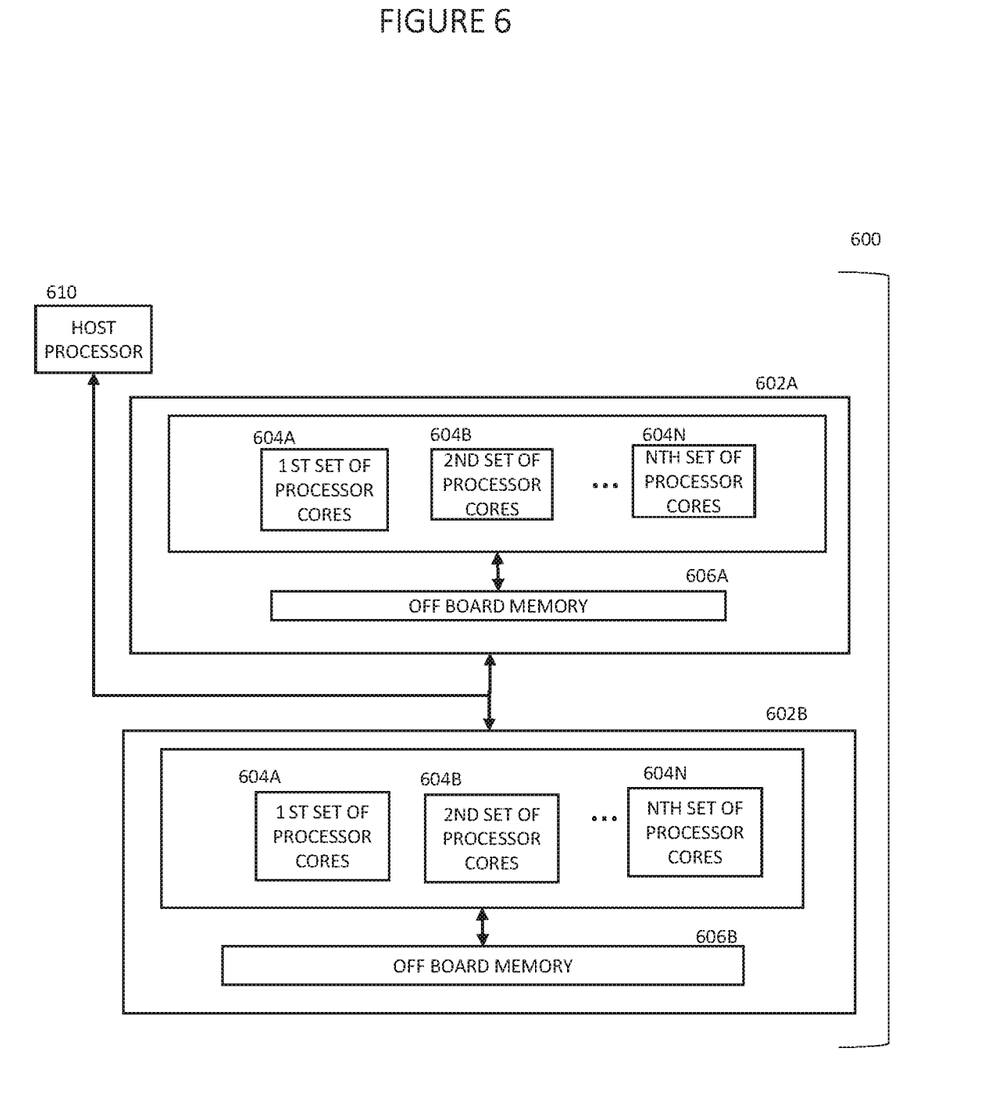
FIG. 6 is a diagram of computer system 600 that may be used to implement various embodiments.

FIG. 6 is a diagram of a computer system computer system 600 that could be used to implement the embodiments described above, such as the process described in FIG. 2. The illustrated computer system computer system 600 comprises multiple processor units 602A-B that each comprises, in the illustrated embodiment, multiple (N) sets of processor cores 604A-N. Each processor unit 602A-B may comprise on-board memory (ROM or RAM) (not shown) and off-board memory 606A-B. The on-board memory may comprise primary, volatile and/or non-volatile, storage (e.g., storage directly accessible by the processor cores 604A-N). The off-board memory 606A-B may comprise secondary, non-volatile storage (e.g., storage that is not directly accessible by the processor cores 604A-N), such as ROM, HDDs, SSD, flash, etc. The processor cores 604A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 610 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 604A-N may train and/or implement different networks or subnetworks or components. For example, in one embodiment, the cores of the first processor unit 602A may implement a lower portion of the stack of strata in the machine learning system 100 in FIG. 1 and the second processor unit 602B may implement the upper portion of the stack of strata in the machine learning system 100. As another example, the cores of the first processor unit 602A may implement a first ensemble member 500A of FIG. 5 and the second processor unit 602B may implement a second ensemble member 500B. In a third example, another multiple processor unit (not shown) may implement the joint optimization network 512. Further, different sets of cores in the first processor unit 602A may be responsible for different subnetworks in the neural network or different ensemble members. One or more host processors 610 may coordinate and control the processor units 602A-B.

In other embodiments, the system 600 could be implemented with a single processor unit. In embodiments where there are multiple processor units, the processor units could be co-located or distributed. For example, the processor units 602A-B may be interconnected by data networks, such as a LAN, WAN, the Internet, etc., using suitable wired and/or wireless data communication links. Data may be shared between the various processing units 602A-B using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

Unless specifically stated otherwise as apparent from the foregoing disclosure, it is appreciated that, throughout the foregoing disclosure, discussions using terms such as "computing," "calculating," "determining," "selecting," "adding," "training," "initializing," or the like, refer to the action and processes of a computer system (e.g., the computer system 600 of FIG. 6), or similar electronic computing device, that manipulates and transforms data represented as physical (electronic) quantities within the computer system's registers and memories into other data similarly represented as physical quantities within the computer system memories or registers or other such information storage, transmission, or display devices.

Based on the above description, it is clear that embodiments of the present invention can be used to improve many different types of machine learning systems, particularly neural networks. For example, embodiments of the present invention can improve recommender systems, speech recognition systems, and classification systems, including image and diagnostic classification systems, to name but a few examples.

Various aspects of the subject matter described herein are set out in the following aspects, implementations, and/or examples, which can be interchangeably combined together in various combinations:

In one general aspect, a computer-implemented method for building a deepend neural network from an initial neural network, the initial neural network comprising a lower portion, an upper portion, and a primary objective according to which the initial neural network is trained based on a primary input, the method comprising: adding, by a computer system, a diversity neural network to the initial neural network at a stratum between the lower portion and the upper portion; adding, by the computer system, a support neural network at the stratum of the initial neural network; wherein the diversity neural network and the support neural network are connected such that data is processed through the diversity neural network and the support neural network unidirectionally; wherein an output of the support neural network is connected to the upper portion of the initial neural network; wherein an input of the support neural network is connected to the lower portion of the initial neural network; wherein the diversity neural network and the support neural network define a stratum neural network; wherein the stratum neural network comprises a stratum objective; wherein the initial neural network and the stratum neural network define the deepend neural network; training, by the computer system, the stratum neural network according to both the primary objective and the stratum objective based on a stratum input supplied to the diversity neural network; and training, by the computer system, the deepend neural network according to the primary objective based on the primary input.

In one aspect, wherein the diversity neural network comprises a first diversity neural network, wherein the support neural network comprises a first support neural network, wherein the stratum neural network comprises a first stratum neural network, wherein the stratum comprises a first stratum, wherein the stratum objective comprises a first stratum objective, wherein the stratum input comprises a first stratum input, and wherein the deepend neural network comprises a first deepend neural network, and wherein the method further comprises: adding, by the computer system, a second diversity neural network to the first deepend neural network at a second stratum between either the lower portion and the first stratum or the upper portion and the first stratum; adding, by the computer system, a second support neural network at the second stratum of the first deepend neural network; wherein the second diversity neural network and the second support neural network are connected such that data is processed through the second diversity neural network and the second support neural network unidirectionally; wherein an output of the second support neural network is connected to either the upper portion of the deepened neural network or the first stratum neural network according to which the second support neural network is positioned below; wherein an input of the second support neural network is connected to either the lower portion of the deepened neural network or the first stratum neural network according to which the second support neural network is positioned above; wherein the second diversity neural network and the second support neural network define a second stratum neural network; wherein the second stratum neural network comprises a second stratum objective; wherein the first deepened neural network and the second stratum neural network define a second deepend neural network; training, by the computer system, the second stratum neural network according to both the primary objective and the second stratum objective based on a second stratum input supplied to the second diversity neural network; and training, by the computer system, the second deepend neural network according to the primary objective based on the primary input.

In one aspect, the second stratum is selected randomly.

In one aspect, the second stratum objective differs from the first stratum objective.

In one aspect, the first stratum input and the second stratum input are supplied from different sources.

In one aspect, each of the first stratum input and the second stratum input comprise the primary input.

In one aspect, the first diversity neural network comprises a first classifier and the second diversity neural network comprises a second classifier.

In one aspect, the first classifier and the second classifier are pretrained to perform distinct classification tasks.

In one aspect, the method further comprises: training, by the computer system, the first classifier and the second classifier to perform distinct classification tasks.

In one aspect, the stratum input comprises the primary input.

In one aspect, the stratum input comprises a subspace of the primary input.

In one aspect, the stratum input comprises a subset of the primary input.

In one aspect, the stratum input comprises a data set distinct from the primary input.

In one aspect, the method is repeated until a stopping criterion is satisfied.

In one aspect, the upper portion of the initial neural network solely comprises output nodes.

In one aspect, the initial neural network has been pretrained according to the primary objective based on the primary input.

In one aspect, the stratum objective comprises a plurality of sub-objectives.

In one aspect, the stratum objective comprises a discrimination task for two or more data items of the primary input that cause, for a neural networking lacking the stratum objective, a difference between a first output activation score for a correct answer and a second output activation score for a best scoring incorrect answer to be less than a threshold value.

In one aspect, the stratum objective comprises the primary objective.

In one aspect, the support neural network comprises one or more linear nodes.

In one aspect, the method further comprises: initializing, by the computer system, the one or more linear nodes to an identity function.

In one aspect, the support neural network comprises an autoencoder.

In one aspect, an input for the autoencoder comprises one or more nodes from the stratum or a lower stratum of the deepend neural network.

In one aspect, the one or more nodes provided as input to the autoencoder are selected according whether they represent one or more features useful for the primary objective.

In one aspect, wherein the diversity neural network comprises a first diversity neural network, wherein the support neural network comprises a first support neural network, wherein the stratum neural network comprises a first stratum neural network, wherein the stratum comprises a first stratum, wherein the stratum objective comprises a first stratum objective, wherein the stratum input comprises a first stratum input, wherein the first stratum is arranged in a first stack, wherein the deepend neural network comprises a first deepend neural network, and wherein the method further comprises: adding, by the computer system, a second diversity neural network to the first deepend neural network at a second stratum in a second stack between the lower portion and the upper portion; adding, by the computer system, a second support neural network at the second stratum of the first deepend neural network; wherein the second diversity neural network and the second support neural network are connected such that data is processed through the second diversity neural network and the second support neural network unidirectionally; wherein an output of the second support neural network is connected to the upper portion of the first deepened neural network; wherein an input of the second support neural network is connected to the lower portion of the deepend neural network; wherein the second diversity neural network and the second support neural network define a second stratum neural network; wherein the second stratum neural network comprises a second stratum objective; wherein the first deepened neural network and the second stratum neural network define a second deepend neural network; training, by the computer system, the second stratum neural network according to both the primary objective and the second stratum objective based on a second stratum input supplied to the second diversity neural network; and training, by the computer system, the second deepend neural network according to the primary objective based on the primary input.

In another general aspect, a computer system comprising a processor and a memory, the memory storing the initial neural network and instructions that, when executed by a processor, cause the computer system to perform the method(s) enumerated above.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for building a deepend neural network from an initial neural network, the initial neural network comprising a lower portion, an upper portion, and a primary objective according to which the initial neural network is trained based on a primary input, the method comprising:
adding, by a computer system, a first diversity neural network to the initial neural network at a first stratum between the lower portion and the upper portion, wherein the first diversity neural network comprises a first classifier for performing a first classification task;
adding, by the computer system, a first support neural network at the first stratum of the initial neural network, wherein the first support neural network comprises a first autoencoder;
wherein the first diversity neural network and the first support neural network are connected such that data is processed through the first diversity neural network and the first support neural network unidirectionally;
wherein an output of the first support neural network is connected to the upper portion of the initial neural network;
wherein an input of the first support neural network is connected to the lower portion of the initial neural network;
wherein the first diversity neural network and the first support neural network define a first stratum neural network;
wherein the first stratum neural network comprises a first stratum objective;
wherein the initial neural network and the first stratum neural network define a first deepend neural network;
training, by the computer system, the first stratum neural network according to both the primary objective and the first stratum objective based on a first stratum input supplied to the first diversity neural network;
training, by the computer system, the first deepend neural network according to the primary objective based on the primary input;
adding, by the computer system, a second diversity neural network to the first deepend neural network at a second stratum between either the lower portion and the first stratum or the upper portion and the first stratum, wherein the second diversity neural network comprises a second classifier for performing a second classification task that is different from the first classification task of the first diversity neural network;
adding, by the computer system, a second support neural network at the second stratum of the first deepend neural network, wherein the second support neural network comprises a second autoencoder;
wherein the second diversity neural network and the second support neural network are connected such that data is processed through the second diversity neural network and the second support neural network unidirectionally;
wherein an output of the second support neural network is connected to either the upper portion of the deepened neural network or the first stratum neural network according to which the second support neural network is positioned below;
wherein an input of the second support neural network is connected to either the lower portion of the deepened neural network or the first stratum neural network according to which the second support neural network is positioned above;
wherein the second diversity neural network and the second support neural network define a second stratum neural network;
wherein the second stratum neural network comprises a second stratum objective;
wherein the first deepened neural network and the second stratum neural network define a second deepend neural network;
training, by the computer system, the second stratum neural network according to both the primary objective and the second stratum objective based on a second stratum input supplied to the second diversity neural network; and training, by the computer system, the second deepend neural network according to the primary objective based on the primary input.

2. The computer-implemented method of claim 1, wherein the second stratum is selected randomly.

3. The computer-implemented method of claim 1, wherein the second stratum objective differs from the first stratum objective.

4. The computer-implemented method of claim 1, wherein the first stratum input and the second stratum input are supplied from different sources.

5. The computer-implemented method of claim 1, wherein each of the first stratum input and the second stratum input comprise the primary input.

6. The computer-implemented method of claim 1, wherein the first stratum input comprises the primary input.

7. The computer-implemented method of claim 1, wherein the first stratum input comprises a subspace of the primary input.

8. The computer-implemented method of claim 1, wherein the first stratum input comprises a subset of the primary input.

9. The computer-implemented method of claim 1, wherein the first stratum input comprises a data set distinct from the primary input.

10. The computer-implemented method of claim 1, wherein the method is repeated until a stopping criterion is satisfied.

11. The computer-implemented method of claim 1, wherein the upper portion of the initial neural network solely comprises output nodes.

12. The computer-implemented method of claim 1, wherein the initial neural network has been pretrained according to the primary objective based on the primary input.

13. The computer-implemented method of claim 1, wherein the first stratum objective comprises a plurality of sub-objectives.

14. The computer-implemented method of claim 1, wherein the first stratum objective comprises a discrimination task for two or more data items of the primary input that cause, for a neural networking lacking the first stratum objective, a difference between a first output activation score for a correct answer and a second output activation score for a best scoring incorrect answer to be less than a threshold value.

15. The computer-implemented method of claim 1, wherein the first stratum objective comprises the primary objective.

16. The computer-implemented method of claim 1, wherein the first support neural network comprises one or more linear nodes.

17. The computer-implemented method of claim 16, further comprising:

initializing, by the computer system, the one or more linear nodes to an identity function.

18. The computer-implemented method of claim 1, wherein an input for the first autoencoder comprises one or more nodes from the first stratum or a lower stratum of the deepend neural network.

19. A computer system for building a deepend neural network from an initial neural network, the computer system comprising:

a processor; and a memory storing:

the initial neural network comprising a lower portion, an upper portion, and a primary objective according to which the initial neural network is trained based on a primary input; and instructions that, when executed by the processor, cause the computer system to:

add a first diversity neural network to the initial neural network at a first stratum between the lower portion and the upper portion, wherein the first diversity neural network comprises a first classifier for performing a first classification task;

add a first support neural network at the first stratum of the initial neural network, wherein the first support neural network comprises a first autoencoder;

wherein the first diversity neural network and the first support neural network are connected such that data is processed through the first diversity neural network and the first support neural network unidirectionally;

wherein an output of the first support neural network is connected to the upper portion of the initial neural network;

wherein an input of the first support neural network is connected to the lower portion of the initial neural network;

wherein the first diversity neural network and the first support neural network define a first stratum neural network;

wherein the first stratum neural network comprises a first stratum objective;

wherein the initial neural network and the first stratum neural network define a first deepend neural network;

train the first stratum neural network according to both the primary objective and the first stratum objective based on a first stratum input supplied to the first diversity neural network;

train the first deepend neural network according to the primary objective based on the primary input;

add a second diversity neural network to the first deepend neural network at a second stratum between either the lower portion and the first stratum or the upper portion and the first stratum, wherein the second diversity neural network comprises a second classifier for performing a second classification task that is different from the first classification task of the first diversity neural network;

add a second support neural network at the second stratum of the first deepend neural network, wherein the second support neural network comprises a second autoencoder;

wherein the second diversity neural network and the second support neural network are connected such that data is processed through the second diversity neural network and the second support neural network unidirectionally;

wherein an output of the second support neural network is connected to either the upper portion of the deepened neural network or the first stratum neural network according to which the second support neural network is positioned below;

wherein an input of the second support neural network is connected to either the lower portion of the deepened neural network or the first stratum neural network according to which the second support neural network is positioned above;

wherein the second diversity neural network and the second support neural network define a second stratum neural network;

wherein the second stratum neural network comprises a second stratum objective;

wherein the first deepened neural network and the second stratum neural network define a second deep-end neural network;

train the second stratum neural network according to both the primary objective and the second stratum objective based on a second stratum input supplied to the second diversity neural network; and train the second deepend neural network according to the primary objective based on the primary input.

20. The computer system of claim 19, wherein the second stratum is selected randomly.

21. The computer system of claim 19, wherein the second stratum objective differs from the first stratum objective.

22. The computer system of claim 19, wherein the first stratum input and the second stratum input are supplied from different sources.

23. The computer system of claim 19, wherein each of the first stratum input and the second stratum input comprise the primary input.

24. The computer system of claim 19, wherein the first stratum input comprises the primary input.

25. The computer system of claim 19, wherein the first stratum input comprises a subspace of the primary input.

26. The computer system of claim 19, wherein the first stratum input comprises a subset of the primary input.

27. The computer system of claim 19, wherein the first stratum input comprises a data set distinct from the primary input.

28. The computer system of claim 19, wherein the upper portion of the initial neural network solely comprises output nodes.

29. The computer system of claim 19, wherein the initial neural network has been pretrained according to the primary objective based on the primary input.

30. The computer system of claim 19, wherein the first stratum objective comprises a plurality of sub-objectives.

31. The computer system of claim 19, wherein the first stratum objective comprises a discrimination task for two or more data items of the primary input that cause, for a neural networking lacking the first stratum objective, a difference between a first output activation score for a correct answer and a second output activation score for a best scoring incorrect answer to be less than a threshold value.

32. The computer system of claim 19, wherein the first stratum objective comprises the primary objective.

33. The computer system of claim 19, wherein the first support neural network comprises one or more linear nodes.

34. The computer system of claim 33, wherein the instructions further cause the computer system to:
    initialize the one or more linear nodes to an identity function.

35. The computer system of claim 19, wherein an input for the first autoencoder comprises one or more nodes from the first stratum or a lower stratum of the first deepend neural network.

* * * * *